Patented Oct. 31, 1950

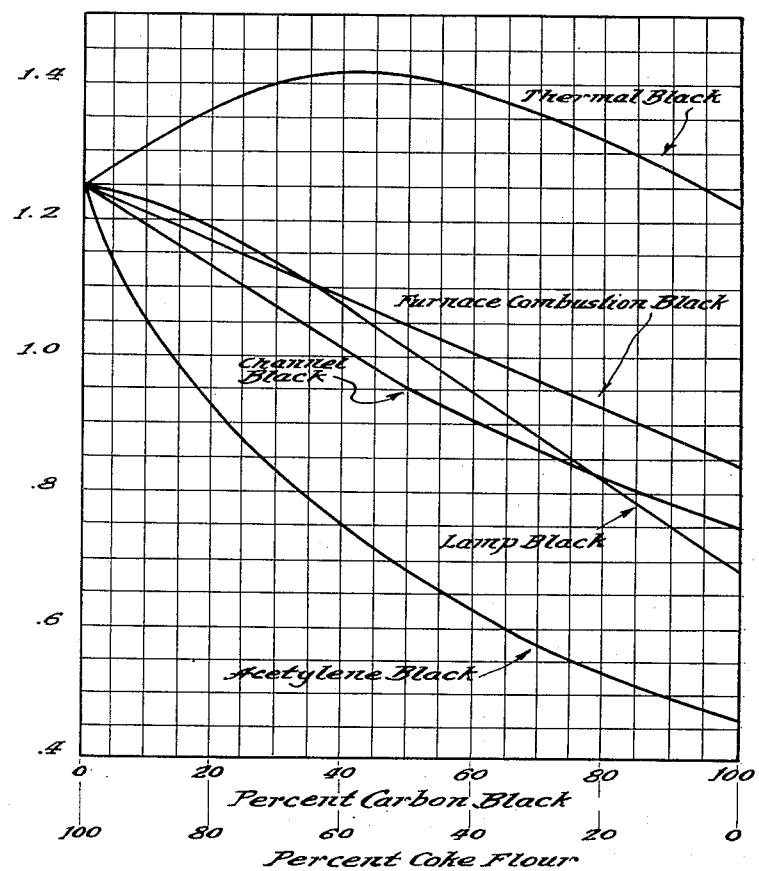

2,527,595

UNITED STATES PATENT OFFICE 2,527,595

CARBON BODY AND METHOD OF MAKING

Lloyd C. Swallen, Lombard, and Harold W. Nelson, Deerfield, Ill., assignors to Great Lakes Carbon Corporation, Morton Grove, Ill., a corporation of Delaware Application March 29, 1946, Serial No. 658,187

7 Claims. (Cl. 106—56)

Our invention relates to the production of carbon bodies having improved physical properties for electrical and structural purposes resulting from the novel combination of certain sub-grinding sized carbon particles with the usual forms of crushed or pulverulent carbon and carbonaceous binders generally employed heretofore.

One object of this invention is to impart a homogeneously increased apparent density and strength to molded carbon bodies regardless of size or thickness of section by incorporating into the usual carbon-binder molding mixtures a suitable proportion of a particular sub-grinding sized carbon known as "thermal carbon black" or thermatomic carbon and which is one of the group of materials comprising carbon blacks.

Other objects are to secure an improved performance and a longer useful life of the carbon article in service and to extend the range of usefulness of carbon for structural purposes, in consequence of the greater weight of carbon per unit volume, decreased porosity, a better mechanical strength, and the like.

A further object is to accomplish the improved result without materially altering or modifying the usual manufacturing steps of mixing carbon with binding material, forming into various shapes and sizes, and heat treating the resulting shaped carbonaceous mass to amorphous or graphitic state.

Still another object is to obtain the improved result under fully controlled and easily reproducible conditions so necessary to low cost and high quality of production.

The structure of carbon bodies such as electrodes is of importance especially in electro-thermal processes where the carbon is consumed. The structure has been dependent upon the selection of suitably proportioned crushed sizes of carbon raw materials, such as pertoleum coke, pitch coke, graphite, coal, electrode scrap, any of which may be fully calcined or not, bonded together by a binder such as pitch filling the voids between the carbon particles and, to some extent, penetrating pore space within the particles themselves. The minimum quantity of binder required is dependent on the amount needed to fill primarily the voids between compressed particles of carbon with perhaps a slight excess thereover to provide for a good working consistency of the mixture, so that it may be molded at reasonable temperatures and pressures. During carbonization of the binder in baking the molded pieces, volatile products of decomposition are evolved. The resulting carbon residue from the binder is considerably more porous than the carbon particles bonded by it as a result of the resistance to shrinkage of the compressed particle structure. It is evident then that the maximum density and strength which can be attained with the usual crushed carbon aggregates is limited by the degree to which voids therein are filled with compact carbon.

The apparent density of an amorphous or graphitic carbon body is a reflection of the extent and porosity of its binder residue. The resistance of a carbon electrode, for example, during use in electro-thermal processes to extraneous air oxidation, to thermal shock causing spalling or breakage, and to penetration by process reactants which may also cause breakage, is considerably dependent upon the degree and extent of porosity of the carbon residue which bonds the electrode. Uses of structural forms of carbon for handling gaseous and liquid materials are also controlled by the extent of porosity.

The strength of a carbon body is concerned primarily with its ability to support itself and to resist breakage under mechanical stresses. This is also related, in some measure, to the amount of the porous binder residue.

The crushed carbon (sources indicated above) usually employed for carbon-binder molding mixtures if generally mixed at the time of adding binder from one or more graded sizes of the crushed carbon. Based upon the total of crushed carbon, there may be mixed with binder as much as 60% relatively large carbon particles from sizes of about 2 to about 35 mesh and the balance relatively smaller sized pulverulent particles, termed "flour," composed of sizes about 35 to less than 325 mesh. The distribution of sizes in the flour may, for example, be about 50–55% by weight passing 200 mesh (74 microns) and about 25–30% by weight passing 325 mesh (43 microns) with very little as small as about 20 microns size. It is neither economical nor easy to pulverize considerable amounts of the usual forms of carbon to 20 micron or smaller sized particles by any known means of pulverizing. There is employed for the crushed carbon aggregate of the carbon-binder mixture varying proportions of the relatively larger sized particles and the relatively smaller sized particles or flour, depending upon the thickness of the finished carbon article and, to some extent, upon its end use. The largest articles, say, about 24 inches or more in thickness, may employ proportions of flour at least about 40% of the total crushed carbon aggregate therein, while the smallest, or not more than a few inches in thickness, may employ flour amounting to as much as 100%.

It is in such crushed carbon aggregates, even when substantially well packed, that voids between the particles still exist amounting to about 30–40% of the volume of the packed aggregate. Even though this space may be completely filled with a pitch binder, baking of the molded mixture re-establishes generally about one-half of such voids as pores in a matrix of carbonized binder residue as a result of the evolution of volatile thermal decomposition products therefrom.

We have found that a substantial improvement in the physical properties of finished carbon articles may be attained by combining suitable amounts of a particular sub-grinding sized carbon black with crushed carbon and usually a somewhat lesser amount of binder than otherwise, thereby filling some portion of the void space between the crushed carbon particles with a more dense or compact carbon structure than prevails with the carbonized binder residue.

The carbon blacks comprise a group of extremely finely divided types of carbon composed of particle sizes at sub-grinding levels. These are also known as colloidal carbons because of their small particle sizes and consequent behavior in aqueous and liquid organic media. There are some, however, whose particle size is outside what may be considered the upper limit of colloidal sizes.

These carbon blacks are products from various commercially used processes in which hydrocarbons are subjected to partial combustion and to non-oxidizing thermal treatment. Several types are produced which differ from one another as to particle size. The various types differ more markedly with little regard to particle size in another respect; some are composed of very dense well defined particles while others consist of rather flocculent particles agglomerated into porous masses.

The size and physical state of the particles for each of the various carbon blacks have been determined in studies employing the electron microscope and such description as used in the classification of carbon blacks below were drawn from "The Surface Area of Colloidal Carbon," vol. III, published by the Columbian Carbon Company, 1942.

The carbon blacks may be classified briefly according to the processes and the hydrocarbons from which they are produced. Such description, for purposes of classification, was drawn from "Developments and Status of Carbon Black," prepared by Isaac Drogin and published by the United Carbon Company, February 1945. Some exceptions as regards the physical properties of the carbon blacks which appear within each group of the classification do occur, and these are noted in the summary which follows. Also included are our measurements of the highly compressed bulk densities of each type of carbon black.

CHANNEL PROCESS CARBONS

The carbon is collected on a metal surface within the impinging flames of gaseous hydrocarbons such as natural gas subjected to controlled combustion at a burner tip. These products consist of flocculent particles having a mean diameter ranging from about 0.013 to about 0.034 micron. The bulk density is of the order of 0.048 g./c. c. as collected; after compression at 2,000 lbs./sq. in. it amounts to about 0.75.

FURNACE PROCESS COMBUSTION CARBON

The carbon is collected from the effluent gases of hydrocarbons subjected to partial combustion in a furnace. Two kinds of product result, depending on whether the hydrocarbon employed is normally a gas or is an oil.

A. *Furnace blacks*

The hydrocarbon raw materials is gaseous, e. g., natural gas, casinghead gas. These carbons consist of flocculent particles having mean diameters ranging from about 0.034 to about 0.081 micron. The bulk density is of the order of about 0.096 g./c. c. as collected; after compresssion at 2,000 lbs./sq. in. it amounts to about 0.84.

B. *Lampblacks*

The hydrocarbon raw material is an oil, e. g., gas oil, tar oil. The carbon consists of flocculent particles, varieties of which have mean particle diameters of 0.097 and 0.060 micron. There are other grades so coarse as to require grinding to pass a 200 mesh (74 microns) sieve. Generally, the lampblacks in comparison with other carbon blacks contain considerable amounts of tarry residues. The bulk density of the fine grades is of the order of 0.064–0.080 g./c. c. as collected, after compression at 2,000 lbs./sq. in. it amounts to about 0.68.

FURNACE PROCESS THERMAL DECOMPOSITION

A. *Thermatomic carbon*

The carbon is collected from the effluent gases of a furnace in which hydrocarbon gases, e. g., natural gas, waste refinery gas, are subjected to substantially complete dissociation to carbon and hydrogen at temperatures of 1200–1400° C. or higher, in the absence of oxidizing gases. These carbons consist of relatively non-flocculent dense particles having mean diameters ranging from about 0.07 or less to about 0.30 micron, extreme sizes varying from about .02 to less than one micron, the smaller sizes of which lie just within what is considered to be the upper limit of colloidal sizes. The bulk density is of the order of 0.48–0.56 g./c. c. as collected; after compression at 2,000 lbs./sq. in. it amounts to about 1.22. These products contain less than 1% volatile matter.

B. *Acetylene black*

The thermal carbon blacks produced from natural gas or similar gaseous hydrocarbons are distinguished from acetylene black, which may be produced by thermal decomposition as well as explosive combustion of acetylene gas, for the reason that the latter are quite different as to physical properties. Acetylene black is composed of very flocculent particles having a mean diameter of about 0.043 micron. Its bulk density is about 0.016 g./c. c. as collected; after compression at 2,000 lbs./sq. in. it amounts to about 0.46.

We are aware of attempts by others in the past to utilize sub-grinding sized carbons described by them as colloidal carbon for increasing the density and strength of molded carbon articles. One form of colloidal carbon used was an aqueous dispersion produced by chemical oxidation as with sulfuric acid, nitric acid, perchlorates, etc., of organic compounds. Such products, however, cannot be considered as true carbons, since they are carbonaceous complexes of carbon with elements of the oxidizing agent. The quantity of such carbon complexes which can be used in crushed carbon-binder mixtures is limited by undesirable reactions of the associated elements such as oxygen, sulfur, chlorine and the like, when subjected to baking and graphitizing operations. We are also aware of the use of thermal decomposition products of gaseous hydrocarbons which are described as suitable for the production of carbon electrodes because of the presence of finely divided forms of carbon. The products were described as mixtures of soot with tarry residues, and as mixtures of solid coherent carbon with finely divided carbon and tar-like residues. Neither of these mixtures can be considered as true carbons of extremely fine size having other well defined physical properties, since, admittedly, considerable hydrocarbonaceous materials as tarry residues were associated with them. Moreover, these materials were formed at temperatures too low, not in excess of about 950° C., for complete carbonization of the highly thermal resistant natural gas as is evidenced by the presence of considerable amounts of tarry residues. Carbon particles so formed would be, to some degree, flocculent and agglomerated to porous masses. Electrodes made directly from the first mixture of soot and tar would have the disadvantage for electro-thermal processes of having too great a preponderance of extremely fine particles bonded together in a relatively porous matrix of carbon residue from the tar binder. The second mixture of coherent carbon with fine carbon and tarry residues was disclosed as having been first calcined to form a solid coke, which required crushing before mixing with a binder and molding to form the carbon article. While this crushed carbon may be composed of more dense particles than crushed carbon from other sources, it still suffers from similar limitations in packing to maximum bulk density as do the usual crushed carbon mixtures generally employed. As a result of the calcination of the mixture, there is no benefit of fine carbon remaining to fill the voids between the packed crushed carbon particles therefrom. Furthermore, had the mixture without calcination been molded directly to form an electrode, it would, undoubtedly, have lacked properly controlled and balanced proportions of solid coherent carbon and fine carbon, so that much improvement in the physical properties of the carbon article could not be attained. The presence of tars in molded carbon mixtures is in itself detrimental because of the relatively low carbon residues obtained from such on baking.

Others have improved the density and strength by thermal deposition of coherent carbon within the pores and on the surfaces of baked carbon articles by subjecting them to treatment at elevated temperatures in an atmosphere of hydrocarbon gases. The effect, however, is limited in penetration to a relatively small depth below the surface of the article. While such treatment improves the structural forms of carbon, it is of little practical value, for example, in large diameter electrodes which are consumed in electrothermal processes where a homogeneous dense carbon structure throughout rather than a dense surface layer is an important factor in performance.

We have discovered that of all of the various types of sub-grinding sized carbon blacks now known and available only the thermatomic carbon will substantially increase the density of a packed crushed carbon aggregate to a maximum when used in suitable proportion therewith. This finding is well illustrated in the accompanying drawing. In this figure are shown the apparent density vs. composition curves for each type of carbon black mixed with calcined petroleum coke flour (in the absence of binder). The apparent or bulk density was measured after compression at 2,000 lbs./sq. in. of the varying proportioned mixtures of coke flour and carbon black. All of the carbon blacks except the thermatomic carbon caused the density of mixtures to decrease progressively with increasing proportions of carbon black. With the thermatomic carbon, however, a maximum packed density was obtained for a mixture containing approximately 60% coke flour and 40% thermatomic carbon.

The predominant factor accounting for relative differences in the packing of carbon blacks as indicated by the packed densities thereof is the physical state of the particles comprising each type of carbon black. These carbons are composed of particles or agglomerated masses of particles which vary from relatively non-flocculent dense and well defined spherical particles as in thermatomic carbon to the highly flocculent irregularly shaped agglomerated masses of particles as in acetylene black. The former packs readily to a close dense structure, while the latter packs to an open or relatively porous structure. The agglomerated structures resist mechanical disruption and cannot be compressed to a high density under any practical conditions. The relative order of packed densities reflects, to a large extent, the degree to which different states of particles tend to form porous agglomerates. The important factor in the practice of our invention is that the carbon particle, in addition to its subgrinding size, be in a relatively non-flocculent dense state as found in thermatomic carbon in order to fill some portion of the voids between packed crushed carbon particles without appreciably expanding the packed structure thereof, and thereby secure a net gain in the packed density of the mixture beyond that of either component alone.

Carrying the above observations over into the actual production of carbon articles, we have found that when mixtures of thermatomic carbon with crushed carbon such as petroleum coke are combined with a fusible binder, molded and baked or further heated to a graphitized state, that there is a substantial increase in the apparent density over that of crushed carbon-binder mixtures, which is in accord with the packed density vs. composition curve shown in the drawing for the thermatomic carbon-crushed carbon mixtures. For other types of carbon blacks in the mix there is generally a slight decrease in the density, however, it is not as great as might be expected from the curves in the drawing because these carbons tend to increase somewhat the coke residue from the binder. Although others have postulated such coke residue increases in the presence of colloidal carbon, we find that the low density packing of carbon blacks other than the thermatomic type substantially cancels out the effect of any gain in coke residue from the binder.

We have also found that the use of optimum amounts of thermatomic carbon substantially reduces the binder requirements based on total carbon in the mix without affecting appreciably the working consistency of the mixture for molding operation. However, for mixtures employing the other carbon blacks, we also found that the binder requirements could not be reduced and still maintain similar working consistency and required substantially the same amount, if not more than, for crushed carbon alone. When the amount of binder is insufficient, the mixture becomes too stiff or "dry" to fuse to a coherent homogeneous mass when molded at reasonable working temperatures and pressures.

Although it appears in the drawing that a carbon mixture containing 40% thermatomic carbon and 60% crushed carbon aggregate composed wholly of flour without binder gave a maximum packed density, this is not necessarily the best proportion when a binder is mixed therewith for the forming of carbon articles or when the aggregate contains crushed particles relatively larger than flour. This proportion of thermatomic carbon may be satisfactory as an upper limit with hydrocarbonaceous binders which contain relatively small amounts of so-called "free carbon" or benzol insoluble material. Generally, however, with the usual pitch binders which contain more than about 10%, to, say, about 30%, of benzol insoluble material, the proportion of thermatomic carbon used is about 25% of such carbon mixture with a least proportion preferably not less than about 10% thereof. When the crushed carbon aggregate component of the mixture comprises some proportion of carbon particles from the 2 to 35 mesh sizes in addition to the carbon flour, the proportions of thermatomic carbon to be used therewith are not then conveniently based upon the total of crushed carbon, but rather upon the amount of the flour which is employed therein. This is due to the fact that the best effect of thermatomic carbon is dependent, to a considerable extent, upon the presence of the carbon flour. So as to include crushed carbon aggregates comprising the relatively larger particles in addition to the flour, it is convenient, therefore, to express the amount of thermatomic carbon to be used therewith as a percentage of the weight of the flour component. It is understood, of course, that the presence of the larger particles in the mix may influence somewhat the relative proportions of thermatomic carbon with respect to the flour component.

A general embodiment of our invention comprises mixing with crushed forms of carbon and binder the sub-grinding sized carbon hereinbefore characterized as thermatomic carbon, forming into desired shapes, and baking or further heat treating to graphitized state.

The amount of thermatomic carbon employed is in the proportion of from about 10% to about 65% of the weight of carbon flour (about 35 to less than 325 mesh sizes) employed or of the carbon flour component of crushed carbon aggregates having admixed therein carbon particles relatively larger than the flour, and preferably not to exceed about 35% of said flour when using the usual pitch binders containing more than about 10% benzol insoluble material. The proportion of large (greater than 35 mesh) crushed carbon particles in the total carbon mixture may be in any amount up to about 60%, and the carbon flour plus thermatomic carbon should be in the proportion of at least about 40% by weight of the total carbon to be mixed with binder. Stated another way, the total carbon mixed with binder is formed from about 10 to about 40 parts by weight of thermatomic carbon, from about 90 to about 60 parts by weight of carbon flour, and from zero to about 160 parts by weight of the relatively large sized (2-35 mesh) carbon particles. It is understood that the carbon flour and the relatively larger particles may be added separately or jointly in the form of a crushed carbon aggregate.

The binders that we may preferably employ are those commonly used in the manufacture of carbon articles and comprise normally solid carbonaceous materials such as coal tar pitches fusible at temperatures from about 70° C. to about 135-140° C., and containing, say, about 10-30% benzol insolubles or "free carbon." However, we are not necessarily limited to such binders for attaining improved results from the foregoing described thermal carbon black and crushed carbon mixtures. Other binders which may be effectively used include specially modified pitches and tars, synthetic resins, pitches which are low or relatively free from benzol insoluble material, and the like. The proportion of binder may be from about 20% to about 35%, but preferably not to exceed about 30%, based upon the total weight of all the carbon mixed therewith. The various components of the molding mixture may be combined simultaneously in any suitable mixing apparatus operating at temperatures above or below the melting point of the binder for sufficient time to give homogeneous mixtures. Alternatively, either the thermatomic carbon, the crushed carbon, or variously sized fractions of the latter may be first mixed with the binder before adding in the remaining carbon components. We prefer, however, for the sake of convenience, to mix all ingredients simultaneously, usually at temperatures considerably higher than the melting point of the binder, in order to secure a uniform and intimate distribution of the binder throughout the mix. Shortly before the mixing is completed, a hydrocarbon oil, "summer oil" or "black oil" as it is generally known, may be added in amounts of about 1-4%, based on the carbon component of the mix for the purpose of lubrication particularly in extrusion operations.

The "green" mix, as it is termed, is then cooled somewhat, as desired, to a temperature suitable for charging into a forming apparatus, such as pressing in a mold or by extruding. Extrusion is generally employed for producing a wide variety of cross-sectional solid or tubular shapes and sizes in lengths up to many feet. Pressures in forming may vary up to 5,000 lbs./sq. in. or more, but we prefer to operate at lower pressures, say, about 2,000-4,000 lbs./sq. in. Although pressure is not particularly critical in the practice of our invention, it is a useful measure for indicating the workability of a green mix. We have found that the workability of a green mix is conveniently indicated by the least pressure required to compress it in a cylindrical die to a maximum density calculated from the weight of the sample and its dimensions while under compression. The temperature of the mix is such as to insure adequate flow of the binder, thereby permitting such pressure to be substantially effective for maximum packing of the carbon components. The measure of workability is particularly useful for indicating when a sufficient proportion of binder is present in the mix, said proportion depending upon the kind and relative amounts of the carbon components and, to a small degree, upon the conditions of forming the mix into the desired articles. In the presentation of experimental data later, we have designated the workability of the effective pressure for maximum density, lbs./sq. in., at a suitable temperature, abbreviated to "E. P./°C."

The formed carbonaceous body is said to be in a "green" state and is not in a finished condition for all purposes. The green body may be heat hardened as such or its binder may be completely carbonized by baking, producing an amorphous carbon body, and the latter may be further heat treated to form a graphitized carbon body.

The improved carbon articles obtained by the practice of our invention are suitable for such purposes as, electrodes for electro-thermal and electrolytic processes, resistors, heat refractories, crucibles, brushes and electrodes for electrical devices, structural material for handling gaseous and liquid substances, and the like.

In other applications of heat refractories, crucibles, commutator brushes, etc., other materials such as ceramics, abrasives, clays, metals or oxides thereof may be mixed in divided form with crushed forms of carbon, thermatomic carbon and binder to form a molding mixture in the manner previously described and so secure the improvements imparted thereto by thermal carbon black.

In structures built from several previously formed carbon sections it is frequently advantageous to bond these sections together by a carbonaceous cement or a compact relatively dense carbonized bond similar in structure to that of the carbon section. Such a bond may be accomplished by utilizing a cement or binder comprising a pitch or other fusible binder of the class previously described containing from about 20% to about 75% thermatomic carbon by weight of the mixture. Preferably, the cement is prepared by working the carbon black into the heated fluid pitch. The cement is applied in a heated or workable condition, after which the cemented structure may be used as such or it may be heated to carbonize the cement.

Having now described the nature and extent of our invention, the following examples will illustrate more fully the substantial improvements in physical properties of amorphous and graphitic carbon articles which result from the practice of this invention.

EXAMPLE I

Baked carbon test specimens of 1⅛ inch diameter molded from a mixture containing (parts by weight) 16.7 thermatomic carbon, 83.3 calcined petroleum coke flour, and 25 coal tar pitch (M. P. 90° C., 19% benzol insolubles) showed an 8.5% increase in apparent density, a 31.7% decrease in porosity, and a 34.0% increase in crushing strength over specimens made wholly from the coke flour and binder in amounts by weight 100 and 34.5 respectively. The measurements of physical properties are shown in Table I. The amount of binder used was optimum for each kind of mixture and gave substantially the same degree of workability for both. Two batches of each mix were prepared in a pressure covered dough-type mixer at 160° C., one at 30 minutes mixing time, and the other at 60 minutes. The four mixes thus obtained were molded in a plug press at 2,000–2,500 lbs./sq. in. and 75–85° C.

*Table I*

| Run No. | Nature of Mix | Time mixing, min. | Molded Green A. D. | Baked to 950° C., 8 days | | |
|---|---|---|---|---|---|---|
| | | | | A. D. | Crushing Strength, p. s. i. | Porosity, Per Cent |
| 1 | with "Thermax" | 30 | 1.77 | 1.66 | 10,900 | |
| 2 | with Thermatomic carbon. | 60 | 1.75 | 1.69 | 11,400 | 17.0 |
| 3 | control | 30 | 1.67 | 1.56 | 8,500 | |
| 4 | do | 60 | 1.70 | 1.53 | 8,500 | 24.9 |

EXAMPLE II

Carbon-binder molding mixtures containing (parts by weight) 100 coke carbon flour and 83.3 coke flour plus 16.7 thermatomic carbon respectively were made up with varying proportions, parts by weight, of pitch binder. All ingredients were the same kind as used in Example I. The results tabulated in Table II show that the improvement in physical properties of baked carbon articles is substantially dependent upon the use of thermatomic carbon in the mixture, with a consequent reduction in the amount of binder required thereby. The mixing was moderately thorough in an open non-pressured dough-type mixer; the mixing times were suitable for each kind of mixture, 45 minutes for the thermatomic carbon mix, and 30 minutes for the control mix. At optimum proportions of binder content the thermatomic carbon mix had a substantially better workability than the control mix. The molding to 1⅛ inch diameter test pieces was done at 2,500 lbs./sq. in. but at different temperatures best suited for the amount of binder present.

*Table II*

| Run No. | Pitch, parts | Workability, E. P./100° C. | Molding Temp., °C. | Green A. D. | Baked to 950° C. 8 days | |
|---|---|---|---|---|---|---|
| | | | | | A. D. | Crushing Strength, p. s. i. |
| THERMATOMIC CARBON MIX | | | | | | |
| 5 | 20 | >6,000 | 85 | 1.62 | 1.58 | 10,300 |
| 6 | 23 | 3,000 | 75 | 1.75 | 1.59 | 8,000 |
| 7 | 25 | 1,500 | 70 | 1.76 | 1.61 | 8,500 |
| 8 | 30 | (Too rich in binder, squeezes out in molding) | | | | |
| CONTROL MIX | | | | | | |
| 9 | 20 | >6,000 | 130 | 1.44 | 1.42 | 3,000 |
| 10 | 25 | >6,000 | 120 | 1.51 | 1.47 | 5,000 |
| 11 | 30 | 4,500 | 92 | 1.63 | 1.50 | 6,200 |
| 12 | 34.5 | 2,500 | 85 | 1.69 | 1.52 | 5,500 |
| 13 | 38 | 2,000 | 80 | 1.67 | 1.50 | 4,900 |

EXAMPLE III

The proportion of thermatomic carbon used in combination with crushed carbon such as calcined petroleum coke carbon flour and pitch binder may be varied considerably and yet secure substantially improved physical properties in baked carbon bodies resulting therefrom as may be seen in Table III. The several test mixtures were made up in an open non-pressured dough-type mixer at 160° C., 30 minutes mixing time. The mixtures were molded to 1⅛ inch diameter electrodes at approximately 2,500 lbs./sq. in. and 100° C. Although the amount of binder was varied somewhat among the mixtures, it was within an optimum range.

*Table III*

| Run No. | Components of Mix ||| Molded Green A. D. | Baked to 950° C. 8 days |||
|---|---|---|---|---|---|---|---|
| | Coke Flour | Thermatomic carbon | Pitch | | A. D. | Crushing Strength, p. s. i. | Resistivity, ohms/cu. in. |
| | Parts by weight | Parts by weight | Parts by weight | | | | |
| 14 | 93 | 7 | 28 | 1.66 | 1.56 | 6,000 | 0.0035 |
| 15 | 89 | 11 | 25 | 1.63 | 1.59 | 6,300 | 0.0035 |
| 16 | 84 | 16 | 24 | 1.69 | 1.59 | 7,300 | 0.0030 |
| 17 | 82 | 18 | 23 | 1.74 | 1.63 | 8,000 | 0.0028 |
| 18 | 80 | 20 | 29 | 1.76 | 1.63 | 8,400 | 0.0028 |
| 19 | 75 | 25 | 30 | 1.76 | 1.63 | 8,500 | 0.0030 |

EXAMPLE IV

Several thermatomic blacks differing somewhat as to particle size were used in mixes with petroleum coke flour and pitch binder and were found to be substantially equivalent for improving the physical properties of baked carbon bodies. These thermatomic blacks are identified by brand names and were all produced by furnace thermal decomposition from the raw materials indicated.

| Thermatomic Carbon, Sample | Hydrocarbon Raw Material | Approximate Mean Particle Size, microns |
|---|---|---|
| A | Natural gas | 0.27 |
| B | Natural gas diluted with hydrogen | 0.074 |
| C | Waste Refinery gas | 0.25 |

The various mixes were made at 160° C. in an open non-pressured dough-type mixer with mixing time of 45 minutes each. Molding was done at 2,500 lbs./sq. in. and 80° C. in a plug press to form 1⅛ inch diameter test pieces. Better workability of the mix and strength of the baked test piece is indicated for the finer sized thermatomic carbon. The weight proportions of components used were 83 coke carbon flour, 17 thermatomic carbon, and 25 coal tar pitch (M. P. 90° C. and 19% benzol insolubles), and the results are shown in Table IV.

*Table IV*

| Run No. | Sample of Thermatomic Carbon | Workability, E. P./100° C. | Molded Green A. D. | Baked to 950° C. 8 days |||
|---|---|---|---|---|---|---|
| | | | | A. D. | Crushing Strength, p. s. i. | Resistivity, ohms/cu. in. |
| 20 | A | 1,650 | 1.74 | 1.60 | 7,000 | 0.0028 |
| 21 | B | 2,700 | 1.73 | 1.59 | 7,200 | 0.0029 |
| 22 | C | 1,150 | 1.76 | 1.60 | 7,600 | 0.0027 |

EXAMPLE V

Representative samples of each type of the known carbon blacks were tested in combination with coke carbon flour and coal tar pitch (M. P. 90° C. and 19% benzol insolubles). The mixes were prepared in an open non-pressured dough-type mixer at 150° C. with mixing time of 45 minutes each. The results are compared in Table V for 1⅛ inch diameter cylindrical pieces (plug press). It is evident that the thermatomic carbon is unique among all carbon blacks in its beneficial effects both as to workability of the mix and on the physical properties of the baked carbon articles.

It will also be seen from the various runs that the use of carbon blacks other than thermal carbon black decreases both the workability of the mix and the physical properties of the baked briquets; note also the appreciable increase in resistivities. Lampblack and acetylene black, in Runs 26 and 27, were particularly difficult to use in order to get mixes satisfactory for molding, hence the proportion of pitch for these was higher as shown. Use of furnace black and lampblack, in Runs 25 and 26, resulted in mechanically defective baked briquets as noted. Acetylene black, in Run 27, was troublesome to use in mixing because of its large bulk, hence it was not convenient to use more than 10 parts in the mix. The use of channel black in the mix, Run 24, gives results for the baked briquets comparable to those from coke flour alone, Run 28. However, the use of furnace black, lampblack and acetylene black, Runs 25, 26 and 27 respectively, give baked physical properties appreciably inferior to those from the coke flour alone. Although the coke residue from the binder was substantially increased in baking briquets containing nearly all types of carbon black other than thermatomic carbon, little or nothing was gained thereby because the poor packing characteristics of such blacks with crushed carbon effectively cancels out the gain in coke residue.

Table V

| Run No. | Components of Mix | | | Workability, E.P./°C. | Molding, p.s.i./°C. | Green A.D. | Baked to 950° C. 8 days | | | |
|---|---|---|---|---|---|---|---|---|---|---|
| | Coke Flour | Carbon Black | Pitch Binder | | | | A.D. | Crushing Strength, p.s.i. | Resistivity, ohms/cu. in. | Binder Coke Residue, Per Cent |
| THERMATOMIC CARBON | | | | | | | | | | |
| | Parts by weight | Parts by weight | Parts by weight | | | | | | | |
| 23 | 83 | 17 | 25 | 1,150/100 | 2,500/85 | 1.76 | 1.60 | 7,600 | 0.0027 | 49.8 |
| CHANNEL BLACK | | | | | | | | | | |
| 24 | 83 | 17 | 25 | >6,000/140 | 5,000/140 | 1.57 | 1.52 | 5,500 | 0.0046 | 59.9 |
| FURNACE BLACK (GAS COMBUSTION) | | | | | | | | | | |
| 25 | 83 | 17 | 25 | >6,000/140 | 5,000/140 | 1.54 | 1.48 | 3,800 (Baked pieces slightly cracked) | 0.0047 | 58.0 |
| LAMPBLACK (FURNACE-OIL COMBUSTION) | | | | | | | | | | |
| 26 | 86 | 14 | 38 | 3,600/140 | 4,000/140 | 1.58 | 1.44 | (Baked pieces badly cracked) | | 64.4 |
| ACETYLENE BLACK (FURNACE-THERMAL DECOMPOSITION OF ACETYLENE) | | | | | | | | | | |
| 27 | 90 | 10 | 38 | 2,800/90 | 2,500/90 | 1.69 | 1.49 | 4,500 | 0.0035 | 50.7 |
| CONTROL—NO CARBON BLACK | | | | | | | | | | |
| 28 | 100 | | 38 | 2,000/80 | 2,500/80 | 1.67 | 1.50 | 4,900 | 0.0030 | 49.1 |

EXAMPLE VI

In a mixture of coke carbon flour and thermatomic carbon, as much as approximately 67% of the latter based on the flour could be satisfactorily used with a coal tar pitch (M. P. 91° C.) binder containing practically no benzol insoluble material to secure substantial improvements in the baked carbon article. Two mixtures with different amounts of thermatomic carbon and a control mix without were mixed 30 minutes at 160° C. and molded to 1⅛ inch diameter test pieces. The various conditions and properties of baked pieces are shown in Table VI.

Table VI

| Run No. | Components of Mix | | | Molted Green A.D. | Baked to 950° C. 8 days | |
|---|---|---|---|---|---|---|
| | Coke Flour | Thermatomic carbon | Pitch | | A.D. | Crushing Strength, p.s.i. |
| | Parts by weight | Parts by weight | Parts by weight | | | |
| 29 | 75 | 25 | 20 | 1.75 | 1.61 | 6,300 |
| 30 | 60 | 40 | 25 | 1.77 | 1.66 | 8,300 |
| 31 | 100 | | 25 | 1.53 | 1.46 | 6,100 |

EXAMPLE VII

Graphite electrodes 3 inches in diameter and 40 inches in length with and without thermatomic carbon were produced in a commercial sized operation from calcined petroleum coke flour, thermatomic carbon, coal tar pitch (M. P. 110° C., free carbon 30%) and black oil. One ton batches were mixed in a paddle type mixer at 150° C. with the black oil added during the last 10 minutes of mixing; the batch containing thermatomic carbon was mixed 45 minutes, and the control batch was mixed 60 minutes. Green electrodes were molded in an extrusion press; thermatomic carbon mix at 4,000 p. s. i. and 100° C., and the control mix at 3,500 p. s. i. and 110° C. The green electrodes were baked to about 1,000° C. to the amorphous state and then graphitized at a temperature above 2,000° C. The effect of thermatomic carbon, both as to binder requirement and physical properties of the electrodes, stands in sharp contrast to the control mix as shown by the averaged data on each lot tabulated in Table VII below.

Table VII

| Run No. | Components of Mix | | | | Green A.D. | Baked Amorphous A.D. | Graphitized Properties | | |
|---|---|---|---|---|---|---|---|---|---|
| | Coke Flour | Thermatomic Carbon | Pitch | Oil | | | A.D. | Transverse Breaking Strength, p.s.i. | Resistivity, ohms/cu. in. |
| | Parts by weight | Parts by weight | Parts by weight | | | | | | |
| 32 | 100 | | 39 | 4 | 1.65 | 1.55 | 1.60 | 2,870 | 0.00027 |
| 33 | 82 | 18 | 27 | 1.6 | 1.73 | 1.71 | 1.78 | 3,500 | 0.00034 |
| Percentage change based on control per cent | | | −30.8 | | | +10.3 | +10.7 | +22.0 | |

EXAMPLE VIII

Improved graphitized electrodes, 4 inches diameter, can be made from a crushed calcined petroleum coke carbon aggregate containing 60% relatively large particles (4 to 20 mesh sizes) and 40% relatively smaller flour particles (35 to minus 325 mesh sizes), plus 38% thermatomic carbon based on the flour therein, plus 25% pitch binder (M. P. 91° C., 19% benzol insolubles) based on total carbon components. All of the ingredients are mixed at about 170° C. for 30 minutes with 1.6% (based on carbon components) black oil lubricant added toward completion of mixing. This mixture is extruded at 3,800 lbs./sq. in. and 80° C. The improvement in the apparent density and transverse breaking strength of 1.52 and 1,350 lbs./sq. in. respectively for the graphitized electrode is shown by comparison with 1.41 and 1,000 lbs./sq. in. for a control product produced under similar conditions but without thermatomic carbon from the same crushed carbon aggregate mixed with 33.8% thereof pitch binder and 1.8% lubricant added toward completion of mix.

EXAMPLE IX

Improved graphitized 9 inch diameter electrodes can be made from a 4 component mixture consisting of the following parts by weight, 18.5 parts thermatomic carbon, 81.5 parts calcined petroleum coke carbon pulverized to flour (sized 35 to minus 325 mesh), 54 parts same coke crushed to relatively larger particles (sized 10 to 20 mesh) and 32 parts pitch binder (M. P. 110° C., 30% benzol insolubles) amounting to 21% of total carbon components. The mixing is done at 146° C. for 45 minutes and 3.1 parts (2% based on carbon components) black oil lubricant is added during the last 10 minutes of mixing. The mix is extruded at 3,800 lbs./sq. in. and 100° C., and the formed body is baked and then graphitized to produce an electrode having the following properties, apparent density 1.71, transverse breaking strength 2,075 lbs./sq. in., and resistivity 0.00049 ohm/cu. in.

We claim as our invention:

1. A dense, strong, uniform carbon body resulting from baking at a carbonizing temperature a mixture of pitch binder and carbon solids, the solids comprising about 10 to about 40% by weight of thermatomic carbon and about 90 to about 62% by weight of comminuted calcined coke.

2. The composition of claim 1 wherein the coke comprises at least 40% by weight of particles smaller than about 35 mesh.

3. The composition of claim 1 wherein the coke is petroleum coke.

4. The composition of claim 1 wherein the coke is petroleum coke and the binder is coal tar pitch.

5. A process for manufacturing a dense, strong, uniform carbon body which comprises forming a mixture of pitch binder and carbon solids, the solids comprising about 10 to about 40% by weight of thermatomic carbon black and about 90 to about 60% by weight of comminuted calcined coke, forming the mixture into a shaped body and baking said body at a carbonizing temperature.

6. The process of claim 5 wherein the coke is petroleum coke.

7. The process of claim 5 wherein the coke is petroleum coke and the binder is coal tar pitch.

LLOYD C. SWALLEN.
HAROLD W. NELSON.

REFERENCES CITED

The following references are of record in the file of this patent:

UNITED STATES PATENTS

| Number | Name | Date |
| --- | --- | --- |
| 404,238 | Wilder | May 28, 1889 |
| 1,243,009 | Thomsen | Oct. 16, 1917 |
| 1,392,267 | Szarvasky | Sept. 27, 1921 |
| 1,920,352 | Brownlee | Aug. 1, 1933 |

FOREIGN PATENTS

| Number | Country | Date |
| --- | --- | --- |
| 508,008 | Great Britain | June 23, 1939 |

OTHER REFERENCES

Gallie: Petroleum Refiner, Gulf Publ. Co., March 1944, vol. 23, No. 3, pages 103–104.